US010215501B1

United States Patent
Reist et al.

(10) Patent No.: US 10,215,501 B1
(45) Date of Patent: Feb. 26, 2019

(54) PHASE CHANGE ACTUATED VALVE FOR USE IN HEAT PIPE APPLICATIONS

(71) Applicant: ADVANCED COOLING TECHNOLOGIES, INC., Lancaster, PA (US)

(72) Inventors: Daniel T. Reist, Mountville, PA (US); Greg Troszak, Elizabethtown, PA (US); Peter Dussinger, Litiz, PA (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 281 days.

(21) Appl. No.: 15/153,239

(22) Filed: May 12, 2016

Related U.S. Application Data

(63) Continuation-in-part of application No. 14/602,730, filed on Jan. 22, 2015, now abandoned.

(51) Int. Cl.
| | |
|---|---|
| F28D 15/06 | (2006.01) |
| F28F 13/06 | (2006.01) |
| G05D 23/02 | (2006.01) |
| F28F 27/00 | (2006.01) |

(52) U.S. Cl.
CPC .............. *F28D 15/06* (2013.01); *F28F 13/06* (2013.01); *F28F 27/00* (2013.01); *G05D 23/02* (2013.01); *G05D 23/022* (2013.01); *G05D 23/023* (2013.01); *G05D 23/024* (2013.01); *G05D 23/025* (2013.01); *G05D 23/026* (2013.01)

(58) Field of Classification Search
CPC ........... F28F 13/06; F28F 27/00; F28D 15/06; G05D 23/02; G05D 23/022–23/026
USPC ............. 165/272, 300; 236/93 A, 99 R, 99 J
See application file for complete search history.

(56) References Cited

U.S. PATENT DOCUMENTS

| 3,145,928 A | 8/1964 | Parker et al. | |
|---|---|---|---|
| 3,602,429 A * | 8/1971 | Levedahl | B60H 1/025 165/104.26 |
| 4,175,697 A | 11/1979 | Dreibelbis | |
| 4,183,466 A | 1/1980 | Dreibelbis | |

(Continued)

FOREIGN PATENT DOCUMENTS

| EP | 0029129 A1 | 5/1981 |
|---|---|---|
| EP | 0092333 A1 | 10/1983 |

(Continued)

*Primary Examiner* — Jianying Atkisson
*Assistant Examiner* — Joel Attey
(74) *Attorney, Agent, or Firm* — McNees Wallace & Nurick LLC

(57) ABSTRACT

A thermally actuated heat pipe control valve which includes a housing having a first opening for receiving a condenser portion of a heat pipe therein, a second opening for receiving an evaporator portion of the heat pipe therein and a passage extending through the housing from the first opening to the second opening. The passage is configured to receive working fluid from the heat pipe therein. A passage closing member is positioned in the housing proximate to or in the passage. The passage closing member having a surface which cooperates with a wall of the passage. At a specific temperature, the passage closing member moves into the passage to a closed position, preventing the flow of the working fluid, thereby preventing heat transfer between the condenser portion and the evaporator portion when the design temperature is reached or exceeded.

19 Claims, 12 Drawing Sheets

(56) References Cited

U.S. PATENT DOCUMENTS

| | | | |
|---|---|---|---|
| 4,492,219 A | | 1/1985 | Schoenheimer et al. |
| 4,595,046 A | | 6/1986 | Iino |
| 4,664,177 A | * | 5/1987 | Edelstein .............. F28D 15/043 |
| | | | 165/104.14 |
| 5,119,061 A | | 6/1992 | Kuze |
| 5,419,133 A | | 5/1995 | Schneider |
| 7,073,528 B2 | * | 7/2006 | Kempf ................... E03B 7/045 |
| | | | 122/13.3 |
| 7,987,914 B2 | * | 8/2011 | Benton ................... E21B 34/06 |
| | | | 166/332.1 |
| 8,066,198 B2 | | 11/2011 | Palanchon et al. |
| 2012/0091212 A1 | | 4/2012 | Guilhamat et al. |

FOREIGN PATENT DOCUMENTS

| | | |
|---|---|---|
| EP | 0604358 B1 | 7/1994 |
| JP | 2003206909 A | 7/2003 |

* cited by examiner

PHASE CHANGE ACTUATED VALVE FOR USE IN HEAT PIPE APPLICATIONS

FIELD OF THE INVENTION

The present invention is directed to a thermally actuated heat pipe control valve. In particular, the invention is directed to a thermally actuated heat pipe control valve having a phase change material actuator.

BACKGROUND OF THE INVENTION

The use of heat pipe based wrap-around heat exchangers (HP-WAHX) is beneficial in regions that have high humidity for most of the year. HP-WAHXs are used to change the performance of the active cooling coils (such as chilled water coiling cools or DX cooling coils). In air conditioning and dehumidification applications, particularly in applications where, for ventilation and indoor air quality purposes, the amount of outside air is relatively high (i.e. 30% or more) the cooling coil must lower the temperature of the air and also condense out excess moisture. Reducing the temperature of the air is called sensible cooling and condensing moisture is called latent cooling. In order to accomplish the level of cooling needed, heat pipe based wrap-around heat exchangers often use large arrays of heat pipes (up to 600 per system) that span two fin coil structures and wrap around existing HVAC components. The heat pipes are generally made of copper with a refrigerant working fluid contained within each sealed pipe. In such systems, it is critical that all parts of the heat pipe envelope remain leak tight.

Variable Conductance Heat Pipes (VCHPs) have been used to vary heat pipe effectiveness (performance) as a function of operating temperature; however, this technology has typically been used to increase power transferred with increasing temperature.

In order for the heat pipes in a WAHX system to operate properly and efficiently, valves may be provided in the heat pipes to control the flow of the working fluid in the heat pipes. When a valve is used, the valve must be hermetically sealed from the outside environment in order for the heat pipe system to function. The valve must also have an open, low pressure drop flow path when it is in the open position.

Currently, known valves are generally electrically controlled valves (solenoid valves and actuated ball valves) which require input electrical or pneumatic power and thermal feedback (temperature sensor and controller). They are also relatively expensive. Other valves, such as phase change material (PCM) valves are known but do not have an open, low pressure drop flow path during operation and are not designed for refrigerant, heat pipe service.

It would, therefore, be beneficial to provide a valve for use in heat pipes which is hermetically sealed, has an open cross section, is compact and is passively thermally actuated. In addition, it would be beneficial to provide such heat pipes which require decreasing power with increasing temperature. In particular, it would be beneficial to provide a valve which uses a phase change material actuator to block off flow through a tube at a predetermined temperature, whereby the valve is fully passive because it is controlled by the expansion and contraction of a phase change material.

SUMMARY OF THE INVENTION

An embodiment is directed to a thermally actuated heat pipe control valve which includes a housing having a first opening for receiving a condenser portion of a heat pipe therein, a second opening for receiving an evaporator portion of the heat pipe therein and a passage extending through the housing from the first opening to the second opening. The passage is configured to receive working fluid from the heat pipe therein. A passage closing member is positioned in the housing proximate to or in the passage. The passage closing member having a surface which cooperates with a wall of the passage. At a specific temperature, the passage closing member moves into the passage to a closed position, preventing the flow of the working fluid, thereby preventing heat transfer between the condenser portion and the evaporator portion when the design temperature is reached or exceeded.

The opening and closing of the valve is determined by the expansion and contraction of a phase change material. The phase change material is encapsulated in an actuator which controls the motion of the passage closing member. The phase change material may be heated by an electrical resistance heater to cause the thermal actuation. The phase change material may be located on an evaporator side of the passage closing member. The phase change material may be located on a condenser side of the passage closing member. The phase change material may be located external to the housing.

The passage closing member may be a pivoting gate mechanism, a rotating mechanism or a sliding mechanism. The mechanism includes a spring which returns the pivoting gate mechanism to its original position.

An embodiment is directed to a thermally actuated heat pipe control valve which includes a housing having a first opening for receiving a condenser portion of a heat pipe therein, a second opening for receiving an evaporator portion of the heat pipe therein and a passage extending through the housing from the first opening to the second opening. The passage is configured to receive working fluid from the heat pipe therein. A phase change material actuator is positioned in the housing. The phase change material actuator has a sealed chamber with phase change material positioned therein. A passage closing member is positioned in the housing proximate to or in the passage and proximate to the phase change material actuator. The passage closing member has a surface which cooperates with a wall of the passage. A heater is provided proximate the phase change material. The heater is positioned outside of the housing. As the heater is activated, the temperature of the phase change material reaches a designed temperature, the phase change material melts and expands causing the passage closing member to move into the passage to a closed position, preventing the flow of the working fluid, thereby preventing heat transfer between the condenser portion and the evaporator portion when the design temperature is reached or exceeded.

An embodiment is directed to a thermally actuated heat pipe control valve for use in a loop heat pipe. The valve includes a housing having a passage, the passage is configured to receive working fluid from the heat pipe therein. A phase change material actuator has a sealed chamber with phase change material positioned therein. A passage closing member is positioned in the housing proximate to or in the passage and proximate to the phase change material actuator. The passage closing member has a surface which cooperates with a wall of the passage. A heater is provided proximate the phase change. As the heater is activated, the temperature of the phase change material reaches a designed temperature, the phase change material melts and expands causing the passage closing member to move into the passage to a closed position, preventing the flow of the working fluid.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
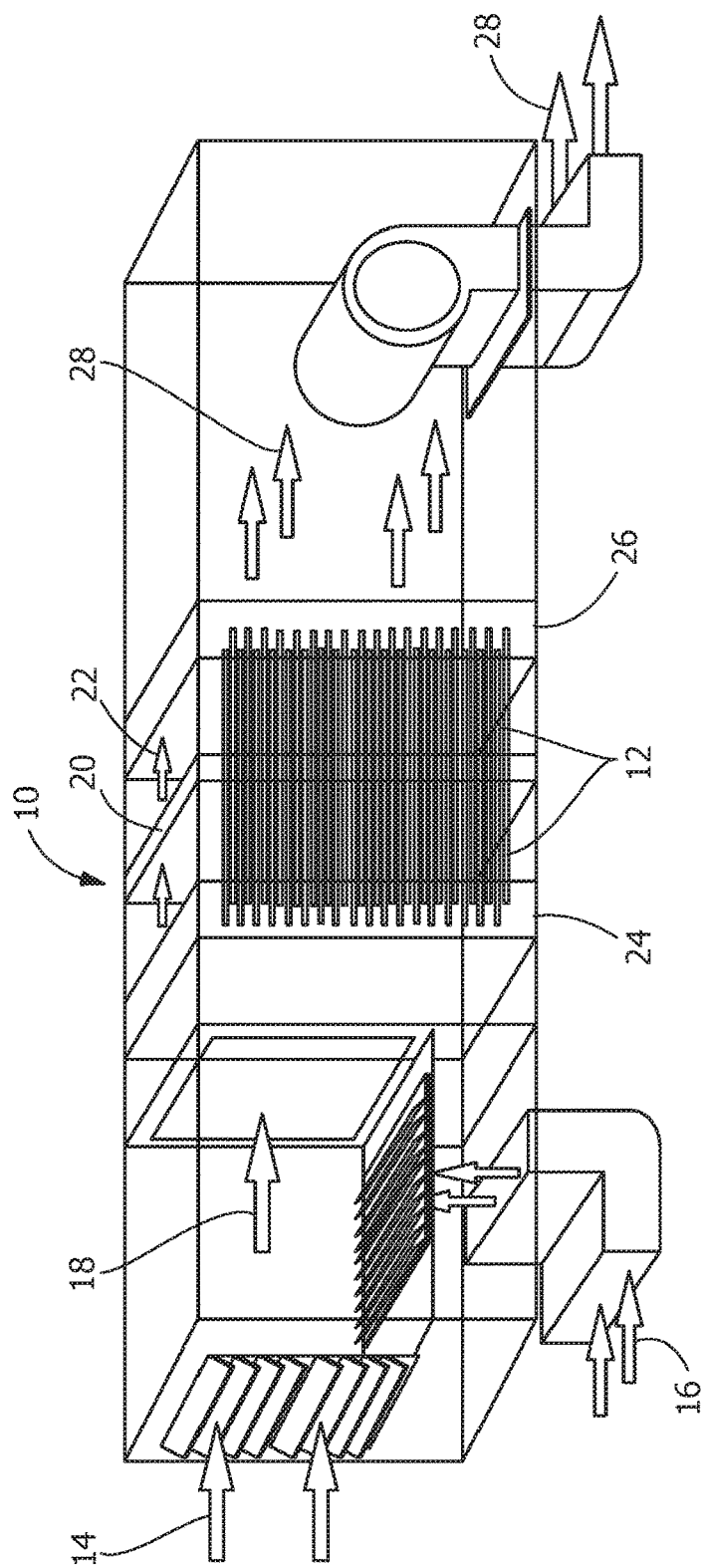
FIG. 1 is a perspective schematic view of an illustrative wrap-around heat exchanger incorporating heat pipes.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

In general, the invention is directed to a valve which uses a phase change material (PCM) actuator to block off flow through a tube at a predetermined temperature. In the illustrative embodiment shown, the phase change valve may be fully passive because it is controlled by the expansion and contraction of a phase change (PC) wax material within a contained vessel. When in the open position, the valve provides an open, low pressure drop flow path through which a working fluid may pass. When in the closed position, the valve blocks the flow path, preventing the flow of the working fluid. The valve of the present invention has many advantages, including, but not limited to, it has an open cross section, is hermetically sealed, simple, inexpensive, compact, reliable and easy to manufacture.

Referring to FIG. 1, an illustrative schematic representation of a wrap-around heat exchanger 10 using heat pipes 12 is shown. Such systems are known in the industry. One such system is the Advanced Cooling Technologies, Inc. Wrap-Around Heat Pipe Enhanced Dehumidification Energy Recovery Heat Exchanger (ACT-HP-WAHX). Such wrap-around heat exchanger 10 using heat pipes 12 offer engineered performance to enhance systems efficiency and greatly reduce energy costs of the system. Such systems offer many advantages, including, but not limited to, enhanced dehumidification by pre-cooling incoming airstreams, no moving parts or system maintenance as the heat pipes are passive, the elimination of typical overcooling to dehumidify, and free passive reheating of the buildings entering airstream.

As shown in FIG. 1, outside air 14 and recirculated air 16 combine to form coil supply air 18. As the coil supply air 18 passes through the cooling coil 20 of the wrap-around heat exchanger 10, the temperature of the coil supply air 18 is reduced or cooled, approaching the dew point of the coil supply air 18, typically referred to as sensible cooling. Once the dew point is met, moisture begins to condense and the temperature of the coil supply air 18 continues to be reduced, thereby combining sensible cooling and latent cooling. The cooler air 22 coming off of the cooling coil 20 contacts the heat pipes 12, thereby reducing the temperature of the heat pipes 12. The cooler heat pipes absorb heat from the incoming warm air stream or coil supply air 18 pre-cooling the coil supply air 18 prior to reaching the cooling coil 20, as represented by the pre-cooling coil 24. The sensible cooling performed by the heat pipes 12 and the pre-cooling coil 24 reduces the initial sensible cooling load on the cooling coil 20 allowing the cooling coil 20 to more quickly reach the dew point. This allows the cooling coil 20 to use more of its capacity to remove latent heat (moisture) and achieve a lower discharge temperature of the discharge air 22. Essentially, the wrap-around heat exchanger 10 using heat pipes 12 changes the sensible heat ratio of the cooling coil 20 to enhance latent heat or moisture removal. The lower temperature discharge air 22 holds less absolute moisture, resulting in increased dehumidification. The energy that the wrap-around heat exchanger 10 using heat pipes 12 extracts from the incoming air stream 18 is subsequently released by the heat pipes 12, as represented by the re-heat coil 26 into the overcooled and dehumidified air 22 leaving the active cooling coil 20. This free, passive reheat warms the exiting building supply air 28 temperature so that the building space into which the building supply air 28 is released is not overcooled. The design of the wrap-around heat exchanger 10 using heat pipes 12 can be tailored (number of rows, fin pitch, etc.) to achieve the desired amount of additional dehumidification and reheat.

The wrap-around heat exchanger 10 using heat pipes 12 is a passive device that responds to the temperature differences imposed upon it. When the temperature difference increases, the power transferred around the active coil 20 increases. If the wrap-around heat exchanger 10 is sized to accommodate the highest expected outside air temperature, the maximum benefit of the wrap-around heat exchanger 10 occurs only when the highest expected outside air temperature is reached. Therefore, during normal operating conditions when the highest expected outside air temperature is not reached, the wrap-around heat exchanger 10 is not being fully utilized. Alternatively, if the wrap-around heat exchanger 10 is designed for a nominal operating temperature (e.g. a typical outside air temperature), the amount of reheat that occurs in the wrap-around heat exchanger 10 will cause the building supply air 28 to be too warm for the space. Therefore, in order to provide proper and efficient cooling regardless of the outside air temperature, the present invention is directed to providing wrap-around heat exchanger 10 using heat pipes 12 in which the flow of the working fluid can be modulated to maximize the dehumidification capacity while preventing overheating.

As described above with respect to known wrap-around heat exchangers 10, there are points or times throughout the operating range of the wrap-around heat exchangers 10 when too much "reheat" is supplied by the wrap-around heat exchangers 10 causing the building supply air 28 to be too warm. In these conditions, it is desirable to temporarily shut down some or all of the heat pipes 12, preventing some or all of the transfer of heat, thereby preventing the overheating of the building supply air 28 from occurring.

In known systems, in order to temporarily shut down or block some or all of the heat pipes, a solenoid valve is provided in each heat pipe to prevent the flow of the fluid between the evaporator and condenser section of the pipe. Each valve must be located between the condenser and evaporator of a heat pipe so that heat transfer between the two ends is temporarily prevented.

However, solenoid valves are costly, bulky and rely on electrical input and thermal feedback, consisting of temperature sensors, smart controllers, computer algorithms, etc. to function properly. In a system with up to 600 heat pipes, the addition of valves to even half of the total heat pipes can be quite a significant increase to the overall system cost. Also, because the heat pipe arrays are very tightly packaged, a large, bulky valve is difficult to fit into most existing heat exchanger systems. In addition, each solenoid valve requires electrical power to open and close. This additional wiring adds complexity and raises installation cost.

Figure 2:
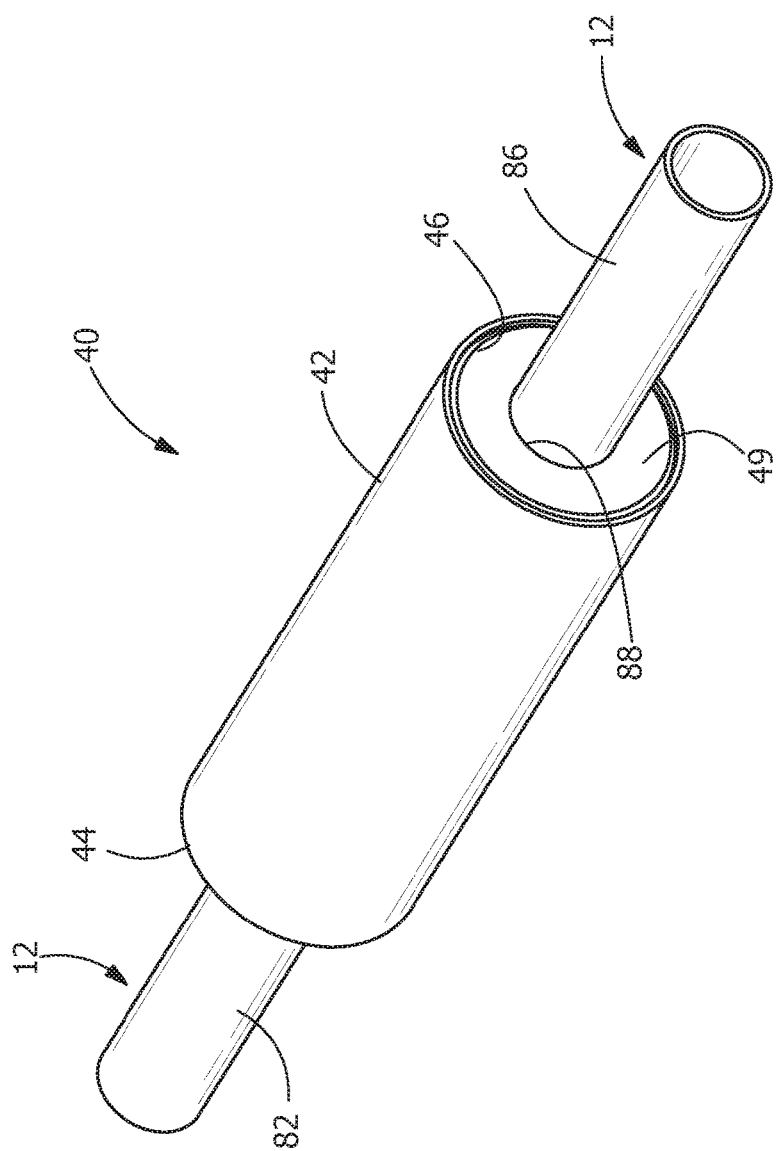
FIG. 2 is a perspective view of an illustrative valve of the present invention in line with a heat pipe.
Figure 3:
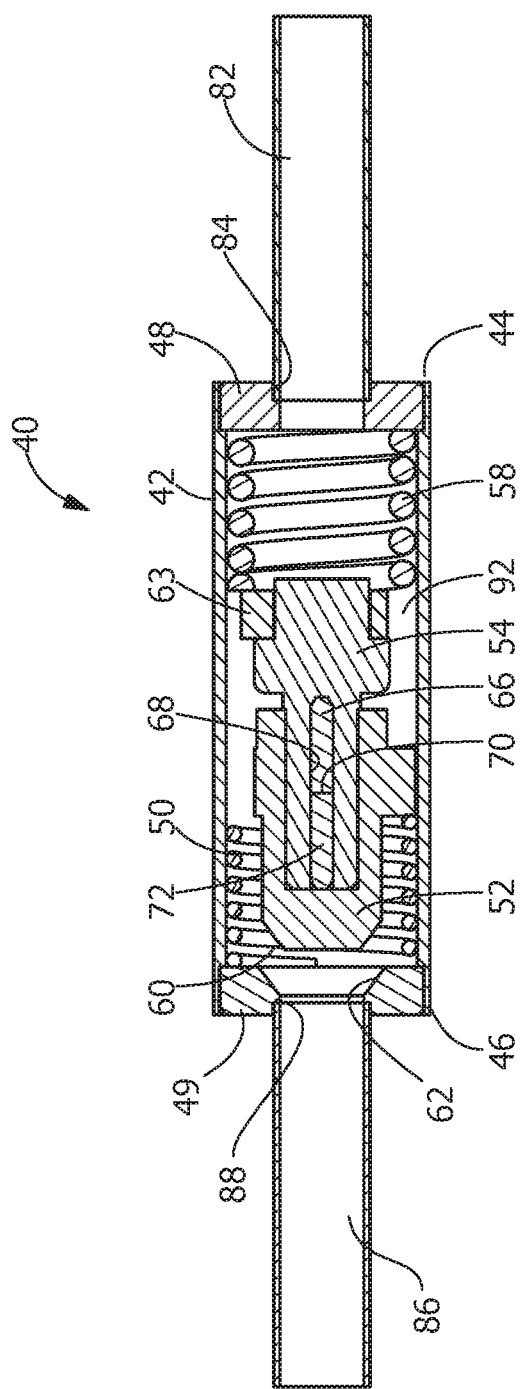
FIG. 3 is a cross-sectional view of the valve of FIG. 2 shown in an open position.
Figure 4:
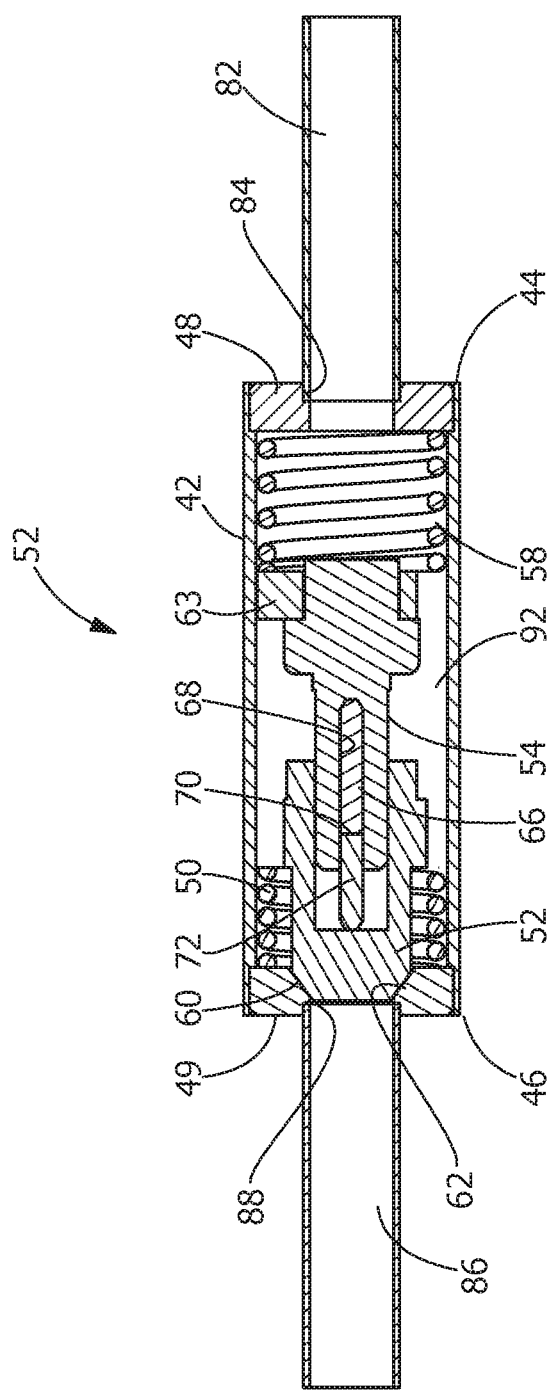
FIG. 4 is a cross-sectional view of the valve of FIG. 2 shown in a closed position.

Referring to FIGS. 2 through 4, an illustrative embodiment of valve 40 according to the teaching of the present invention is shown. The valve 40 is a passive valve as will be more fully described below. In the illustrative embodiment shown, the valve 40 has an outside housing 42 which has a generally cylindrical configuration. Each end 44, 46 of the housing 42 has an end cap 48, 49 that serves as an interface with the heat pipe 12 at the inlet end 44 and the outlet end 46 of the valve 40. The housing 42 and end caps 48, 49 may be made from metal, plastic or any material having the required characteristics to allow a fluid to pass therethrough without leaking or failing. The particular configuration of the valve 40 and end caps 48, 49 may be varied without departing from the scope of the invention.

As best shown in FIGS. 3 and 4, the valve 40 includes a return spring 50, a passage closure member, such as a tapered plug 52, a phase change material actuator 54, a spring retention member 63, and a relief spring 58. The phase change material actuator 54 is engineered to produce a linear force at a specific temperature which corresponds to the melting point of the phase change material inside. The return spring 50 is provided to reopen the valve 40 after the temperature of the heat pipe 12 drops below the melting point of the phase change material of the phase change material actuator 54 and the phase change material solidifies. The return spring 50 has sufficient spring force to recompress the solidified phase change material within the phase change material actuator 54. The tapered plug 52 is the mechanism used to create a seal inside of the valve. A tapered section 60 of the tapered plug 52 mates with a tapered surface 62 in the end cap 49 at the outlet end 46. The slope of the tapered section 60 and the tapered surface 62 are similar to allow the tapered section 60 and the tapered surface 62 to create a reliable seal when the tapered plug 52 is moved to the closed position. The use of a tapered section 60 of the tapered plug 52 ensures a self-aligning, adequate seal under pressure, yet does not bind when the valve 40 is reopened and the tapered section 60 is moved away from the tapered surface 62, causing the seal to be broken.

A spring retention member 63 is a mechanical adapter provided between the phase control material actuator 54 and the relief spring 58. The spring retention member 63 is used to capture the relief spring 58 between the spring retention member 63 and the end cap 48. The relief spring 58 is used to allow additional expansion of the phase change material actuator 54 after the valve 40 is fully closed. The relief spring 58 is generally significantly stiffer, i.e. has a greater spring force, than the return spring 50.

The phase change material actuator 54 is a sealed housing that contains a phase change material 66, such as, but not limited to, a wax, which generates linear motion as it melts. The phase change material 66 is housed in a chamber 68 of the housing. As the chamber 68 has a defined shape and volume, the chamber 68 can be configured to properly control the direction and rate of expansion of the phase change material 66 when it melts and when it is solidified. In the illustrative embodiment shown, the expansion of the phase change material 66 deforms a seal 70 which drives a piston 72 outward toward the tapered plug 52. In some embodiments, the phase change material actuator 54 may be self contained and inserted into the housing 42 of the valve 40. Alternatively, the phase change material actuator 54 may be integrally manufactured within the valve 40, with the chamber 68 machined directly into the valve housing 42.

During assembly, the housing 42 is joined to the inlet end cap 48 using known methods, such as, but not limited to soldering, brazing, or welding (e.g. by TIG fusing, electron beam, laser). With the end cap 48 properly attached to the housing 42, the internal components are positioned in the housing 42. In the embodiment shown, the components are inserted in the following order: the relief spring 58, the spring retention member 63, phase change material actuator 54, the tapered plug 52 and the return spring 50. However, other methods and other orders of insertion can occur without departing from the scope of the invention. The end cap 49 is then joined to the housing 42 using known methods, such as, but not limited to soldering, brazing, or welding (e.g. by TIG fusing, electron beam, laser). Because the internal components are preloaded to a specific level, i.e. the springs 50, 58 are positioned in a compressed or preloaded position, a dedicated fixture is required to compress the outlet end cap 49 into place while it is attached to the housing 42. Once the outlet end cap 49 has been attached to the housing 42 of the valve 40, the fully assembled valve 40 is removed from the fixture.

The completed valve 40 can then be inserted onto a respective heat pipe 12. In so doing an end of a heat pipe segment 82 is inserted into an opening 84 of the end cap 48. The end cap 48 is attached to the heat pipe segment 82 using known methods, such as, but not limited to soldering, brazing, or welding (e.g. by TIG fusing, electron beam, laser). In the illustrative embodiment shown, the heat pipe segment 82 is a condenser portion of the heat pipe 12, although other configurations can be used. An end of a heat pipe segment 86 is also inserted into an opening 88 of the end cap 49. The end cap 49 is attached to the heat pipe segment 86 using known methods, such as, but not limited to soldering, brazing, or welding (e.g. by TIG fusing, electron beam, laser). In the illustrative embodiment shown, the heat pipe segment 86 is an evaporator portion of the heat pipe 12, although other configurations can be used.

The valves 40 of the illustrative embodiment shown in FIGS. 2 through 4 are fully passive, meaning the valves 40 require no additional energy input to function. This is in contrast to a solenoid valve which offers thermal control, but requires both electrical and temperature inputs, which in turn requires wiring and proper thermocouple placement in order to work effectively.

In use, each valve 40 remains open until a design temperature is reached. In the open position (as shown in FIG. 3), the tapered plug 52 does not engage the tapered surface 62 of the channel 92 which extends through the valve 40. The channel 92 accommodates the flow of the working fluid between the heat pipe segment 82 and the heat pipe segment 86. As the tapered plug 52 is not positioned in and does not block the channel 92, the working fluid flows through the channel 92 and passes through the valve 40. In the open position, the phase change material 66 is in a solid state.

As the ambient temperature reaches the design temperature, the phase change material 66 is melted and expands, causing the piston 72 to move toward and engage the tapered plug 52. As this occurs, the piston 72 moves the tapered plug 52 and the tapered section 60 into engagement with the tapered surface 62 of the channel 92, thereby causing the passage or channel 92 through the valve 40 to be closed or blocked. In the closed position (as shown in FIG. 4), the working fluid is prevented from passing through the channel 92 of the valve 40, thereby preventing heat transfer between the condenser portion 82 and the evaporator portion 86 when the designed temperature is reached or exceeded.

Phase change material 66 remains in the melted, expanded state and the valve 40 remains closed the entire time that the heat pipe temperature is above the design temperature. In this closed position, the piston 72 is maintained in position with the tapered plug 52 and the tapered plug 52 remains in engagement with the surface 62 of end cap 49 positioned at the end of the channel 92. The relief spring 58 allows for some continued expansion of the phase change material 66 after the piston 72 engages the tapered plug 52, thereby preventing excess pressure from damaging the piston 72, the tapered plug 52 and/or the phase change material actuator 54.

When the temperature drops below the design temperature, the phase change material 66 again solidifies. As this occurs, the return spring 50 causes the tapered plug 52 and the piston 72 to move from the closed position (FIG. 4) to the initial or open position (FIG. 3), thereby allowing the working fluid to again pass through the valve 40, allowing the heat pipes 12 to resume normal operation.

The valve 40 of the present invention is tunable by selecting different temperature level phase change materials. A wrap-around heat exchanger 10 can be designed to incorporate valves 40 which have phase change materials which are activated or melted at different temperature, thereby allowing respective valves to be actuated across a wide temperature spectrum. For example, a wrap-around heat exchanger 10 may include several valves with phase change materials with a 75 degree Fahrenheit melting temperature, several valves with phase change materials with an 85 degree Fahrenheit melting temperature and several valves with phase change materials with a 95 degree Fahrenheit melting temperature. In so doing, the wrap-around heat exchanger 10 can be manufactured with valves 40 that disable the most efficient number of heat pipes 12 as a function of the ambient temperature, thereby preventing excess reheating without compromising on efficiency at lower inlet air temperatures. The phase change material is chosen such that the phase change material has a significant change in volume as the temperature is varied by a few degrees, thereby allowing the actuation of the valve 40 to occur over a small range of temperatures.

As previously stated, wrap-around heat exchangers 10 often have large numbers of heat pipes 12 associated therewith. Therefore, as the heat pipes 12 are provided in relatively confined spaces, the space available for the valves 40 is limited. As the valves 40 are passive, no additional electronic components are needed, thereby allowing the housing 42 of the valves 40 to be slender and compact body, allowing a higher number of heat pipes 12 and valves 40 to be packaged within a given coil volume. As an example, in one application a typical heat pipe diameter may be 0.500 inches and a valve according to the present invention may have an outside diameter of approximately 1.125 inches. This results in a radial size increase of only 0.313 inches over the standard heat pipe. In contrast, solenoid valves are inherently bulky due to the magnetic coil used to activate the valve, which ultimately results in increased spacing demands between heat pipes.

Figure 5:
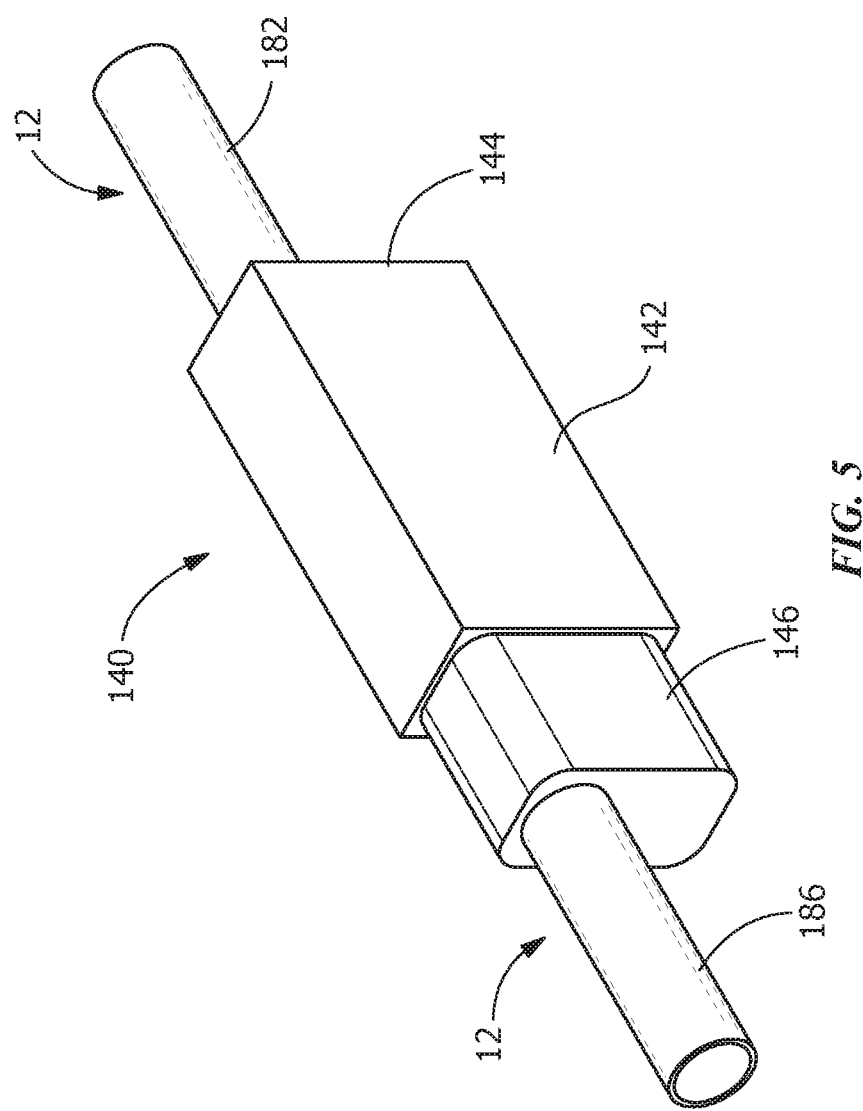
FIG. 5 is a perspective view of a first alternate illustrative valve of the present invention in line with a heat pipe.
Figure 6:
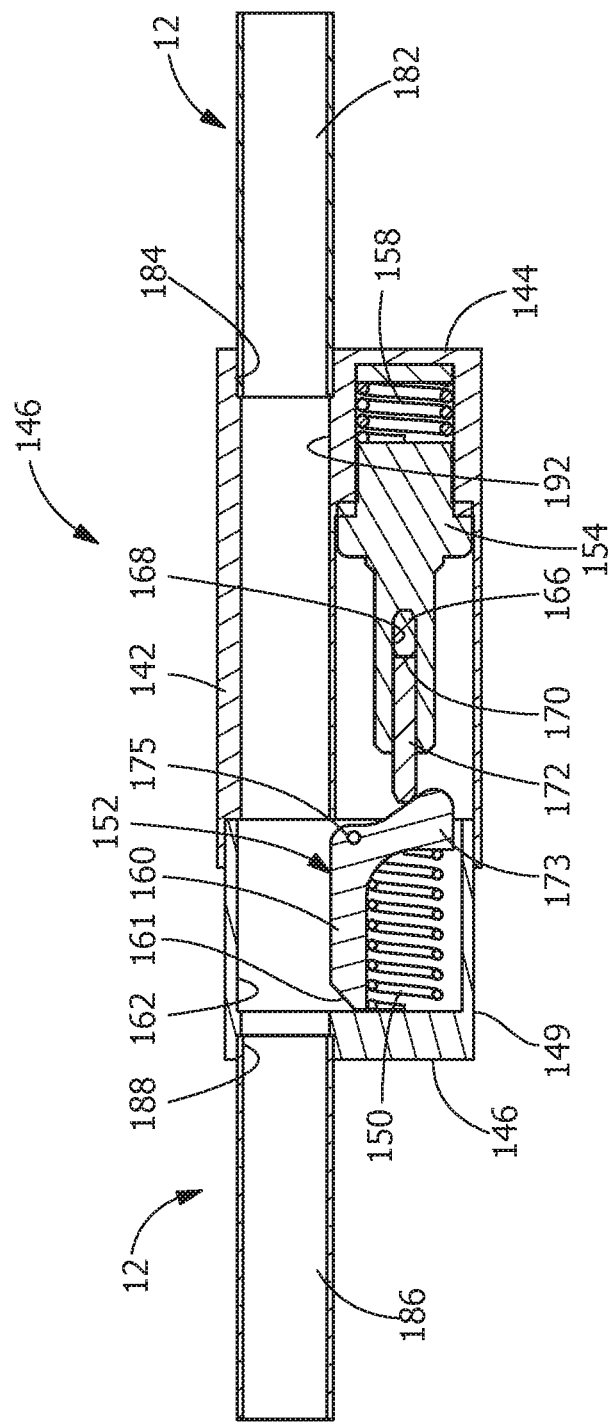
FIG. 6 is a cross-sectional view of the valve of FIG. 5 shown in an open position.
Figure 7:
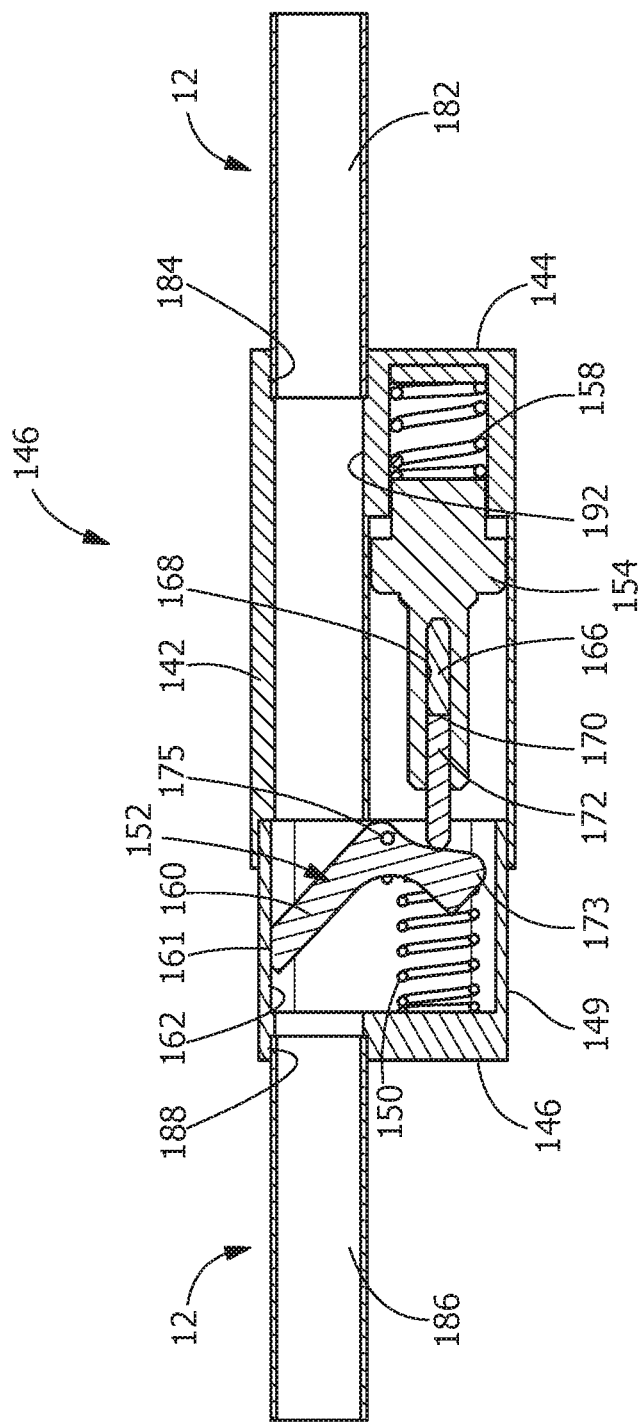
FIG. 7 is a cross-sectional view of the valve of FIG. 5 shown in a closed position.

Referring to FIGS. 5 through 7, an illustrative embodiment of an alternate valve 140 according to the teaching of the present invention is shown. The valve 140 is a passive valve as will be more fully described below. In the illustrative embodiment shown, the valve 140 has an outside housing 142 which has a generally rectangular configuration with ends 144, 146. End 146 of the housing 142 has an end cap 149 that serves as an interface with the heat pipe 12 at the outlet end 146 of the valve 140. The housing 142 and end cap 149 may be made from metal (such as brass, copper, stainless steel), plastic or any material having the required characteristics to allow a fluid to pass therethrough without leaking or failing. The particular configuration of the valve 140 and end cap 149 may be varied without departing from the scope of the invention.

As best shown in FIGS. 6 and 7, the valve 140 a return spring 150, a passage closing member, such as a gate 152, a phase change material actuator 154, and a relief spring 158. The phase change material actuator 154 is engineered to produce a linear force at a specific temperature which corresponds to the melting point of the phase change material inside. The return spring 150 is provided to reopen the valve 140 after the temperature of the heat pipe 12 drops below the melting point of the phase change material of the phase change material actuator 154 and the phase change material solidifies. The return spring 150 has sufficient spring force to recompress the solidified phase change material within the phase change material actuator 154. The gate 152 is the mechanism used to create a seal inside of the valve. The gate 152 may be, but is not limited to, a flexible reed, a pivoting mechanism, a sliding mechanism, or a rotating mechanism. An arm 160 of the gate 152 engages with a surface 162 in the end cap 149 at the outlet end 146. An end of the arm 160 may have an angled surface 161 to cooperate with the surface 162 to create a reliable seal when the gate 152 is moved to the closed position. The use of the arm 160 provides an adequate seal under pressure, yet does not bind when the valve 140 is reopened and the arm 160 is moved away from the surface 162, causing the seal to be broken.

The relief spring 158 is used to allow additional expansion of the phase control material actuator 154 after the valve 140 is fully closed. The relief spring 158 is generally significantly stiffer than the return spring 150.

The phase change material actuator 154 is a sealed housing that contains a phase change material 166, such as, but not limited to, a wax, which generates linear motion as it melts. The phase change material 166 is housed in a chamber 168 of the housing. As the chamber 168 has a defined shape and volume, the chamber 168 can be configured to properly control the direction and rate of expansion of the phase change material 166 when it melts and when it is solidified. In the illustrative embodiment shown, the expansion of the phase change material 166 deforms a seal 170 which drives a piston 172 outward toward the gate 152. In some embodiments, the phase change material actuator 154 may be self contained and inserted into the housing 142 of the valve 140. Alternatively, the phase change material actuator 154 may be integrally manufactured within the valve 140, with the chamber 168 machined directly into the valve housing 142. The piston 172 cooperates with a piston engagement portion 173 of the gate 152, whereby as the piston 172 is moved toward the gate 152, the piston engages the piston engagement portion 173 causing the gate 152 to pivot about pivot point 175. As this occurs, the arm 160 is moved from the first or open position shown in FIG. 6 to the second or closed position shown in FIG. 7.

In the embodiment shown, the components are inserted in the following order: the relief spring 158, phase change material actuator 154, the gate 152 and the return spring 150. However, other methods and other orders of insertion can occur without departing from the scope of the invention. The end cap 149 is then joined to the housing 142 using known methods, such as, but not limited to soldering, brazing, or welding (e.g. by TIG fusing, electron beam, laser). Because the internal components are preloaded to a specific level, i.e. the springs 150, 158 are positioned in a compressed or preloaded position, a dedicated fixture is required to compress the outlet end cap 149 into place while it is attached to the housing 142. Once the outlet end cap 149 has been attached to the housing 142 of the valve 140, the fully assembled valve 140 is removed from the fixture.

The completed valve 140 can then be inserted onto a respective heat pipe 12. In so doing an end of a heat pipe segment 182 is inserted into an opening 184 of the end 144. In the illustrative embodiment shown, the heat pipe segment 182 is a condenser portion of the heat pipe 12, although other configurations can be used. An end of a heat pipe segment 186 is also inserted into an opening 188 of the end cap 149. The end cap 149 is attached to the heat pipe segment 186 using known methods, such as, but not limited to soldering, brazing, or welding (e.g. by TIG fusing, electron beam, laser). In the illustrative embodiment shown, the heat pipe segment 186 is a condenser portion of the heat pipe 12, although other configurations can be used.

The valves 140 of the illustrative embodiment shown in FIGS. 5 through 7 are fully passive, meaning the valves 140 require no additional energy input to function. This is in contrast to a solenoid valve which offers thermal control, but requires both electrical and temperature inputs, which in turn requires wiring and proper thermocouple placement in order to work effectively.

In use, each valve 140 remains open until a design temperature is reached. In the open position (as shown in FIG. 6), the gate 152 does not engage the surface 162 of the channel 192 which extends through the valve 140. The channel 192 accommodates the flow of the working fluid between the heat pipe segment 180 and the heat pipe segment 184. As the gate 152 is not positioned in and does not block the channel 192, the working fluid flows through the channel 192 and passes through the valve 140. In the open position, the phase change material 166 is in a solid state.

As the ambient temperature reaches the design temperature, the phase change material 166 is melted, causing the piston 172 to move toward and engage the gate 152. As this occurs, the piston 172 moves the gate 152 and the arm 160 into engagement with the surface 162 of the channel 192, thereby causing the passage or channel 192 through the valve 140 to be closed or blocked. In the closed position (as shown in FIG. 7), the working fluid is prevented from passing through the channel 192 of the valve 140, thereby preventing heat transfer between the condenser portion 182 and the evaporator portion 186 when the designed temperature is reached or exceeded. Phase change material 166 remains in the melted state and the valve 140 remains closed the entire time that the ambient temperature is above the design temperature. In this closed position, the piston 172 is maintained in position with the gate 152 and the gate 152 remains in engagement with the surface 162 of the channel 192. The relief spring 158 allows for some continued expansion of the phase change material 166 after the piston 172 engages the gate 152, thereby preventing excess pressure from damaging the piston 172, the gate 152 and/or the phase change material actuator 154.

When the temperature drops below the design temperature, the phase change material 166 again solidifies. As this occurs, the return spring 150 causes the gate 152 and the piston 72 to move from the closed position (FIG. 7) to the initial or open position (FIG. 6), thereby allowing the working fluid to again pass through the valve 140, allowing the heat pipes 12 to resume normal operation.

The valve 140 of the present invention is tunable by selecting different temperature level phase change materials. A wrap-around heat exchanger 10 can be designed to incorporate valves 140 which have phase change materials which are activated or melted at different temperature, thereby allowing respective valves to be actuated across a wide temperature spectrum. For example, a wrap-around heat exchanger 10 may include several valves with phase change materials with a 75 degree Fahrenheit melting temperature, several valves with phase change materials with an 85 degree Fahrenheit melting temperature and several valves with phase change materials with a 95 degree Fahrenheit melting temperature. In so doing, the wrap-around heat exchanger 10 can be manufactured with valves 140 that disable the most efficient number of heat pipes 12 as a function of the ambient temperature, thereby preventing excess reheating without compromising on efficiency at lower inlet air temperatures. The phase change material is chosen such that the phase change material has a significant change in volume as the temperature is varied by a few degrees, thereby allowing the actuation of the valve 140 to occur over a small range of temperatures.

As previously stated, wrap-around heat exchangers 10 often have large numbers of heat pipes 12 associated therewith. Therefore, as the heat pipes 12 are provided in relatively confined spaces, the space available for the valves 140 is limited. As the valves 140 are passive, no additional electronic components are needed, thereby allowing the housing 142 of the valves 140 to be slender and compact body, allowing a higher number of heat pipes 12 and valves 140 to be packaged within a given coil volume. In contrast, solenoid valves are inherently bulky due to the magnetic coil used to activate the valve, which ultimately results in increased spacing demands between heat pipes.

Figure 8:
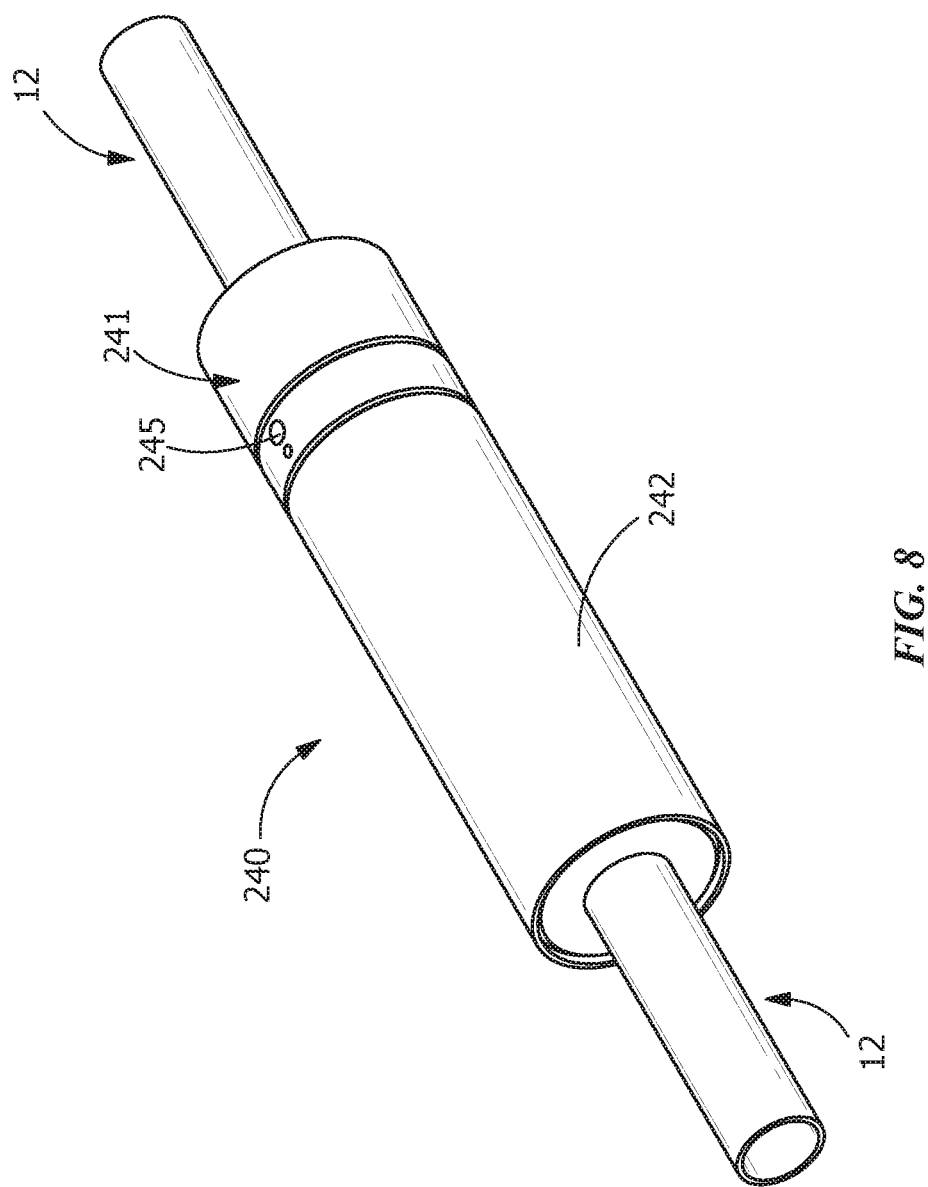
FIG. 8 is a perspective view of a second alternate illustrative valve of the present invention in line with a heat pipe.
Figure 9:
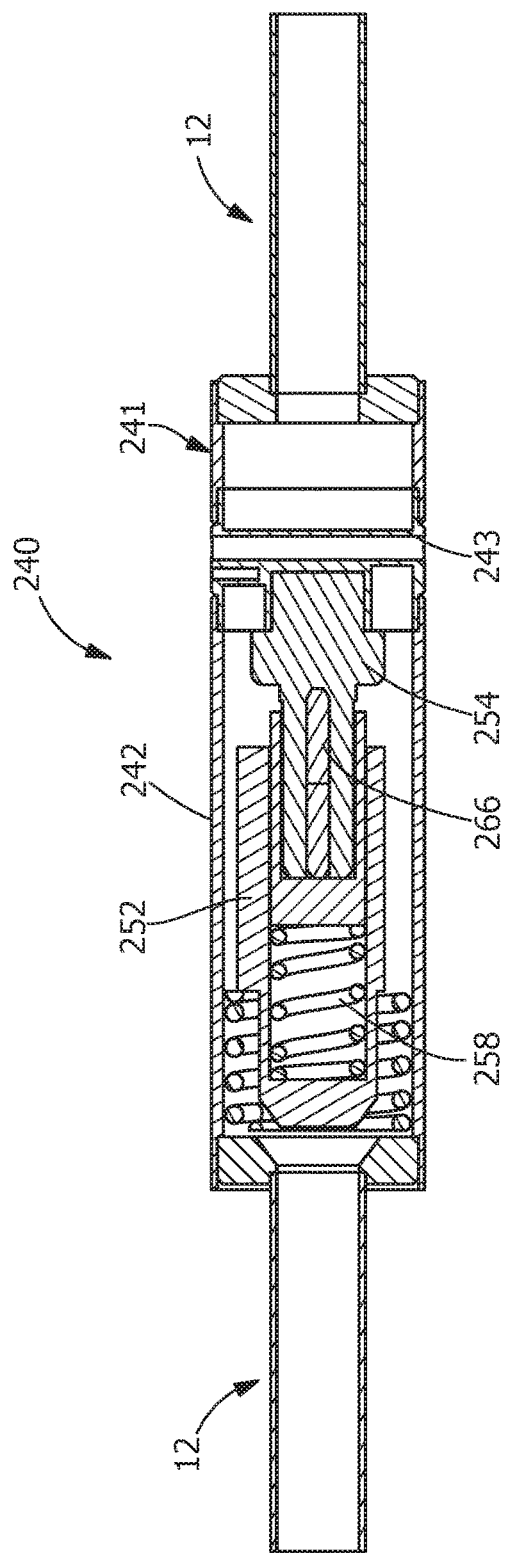
FIG. 9 is a cross-sectional view of the valve of FIG. 8 shown in an open position.
Figure 10:
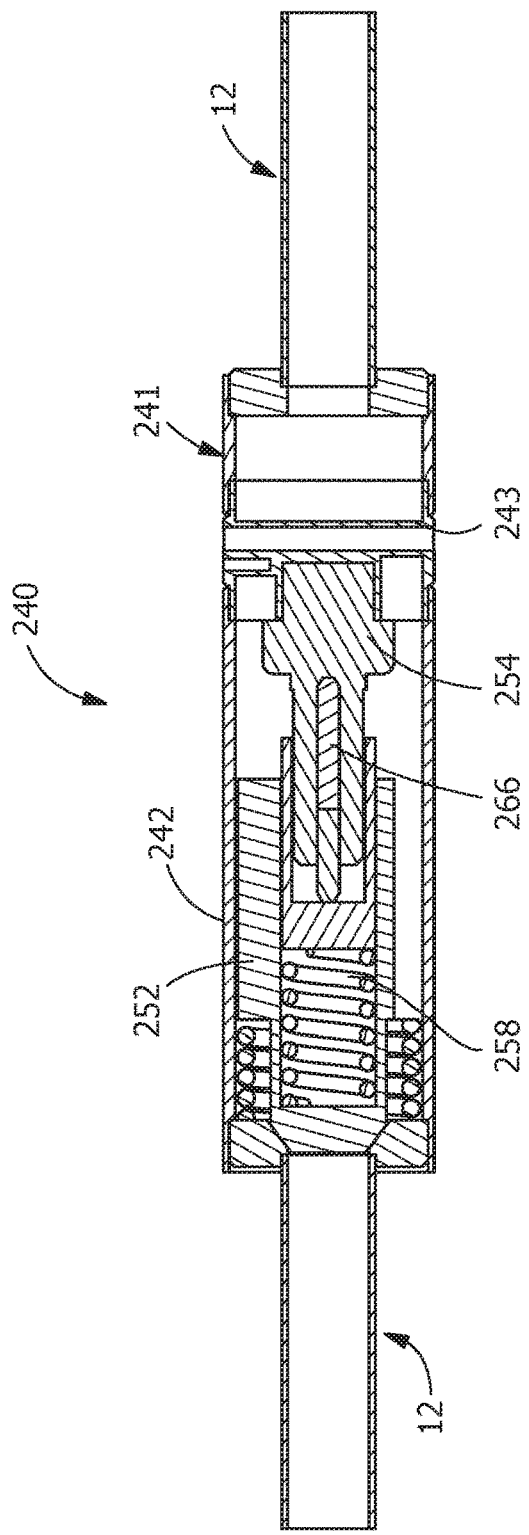
FIG. 10 is a cross-sectional view of the valve of FIG. 8 shown in a closed position.
Figure 11:
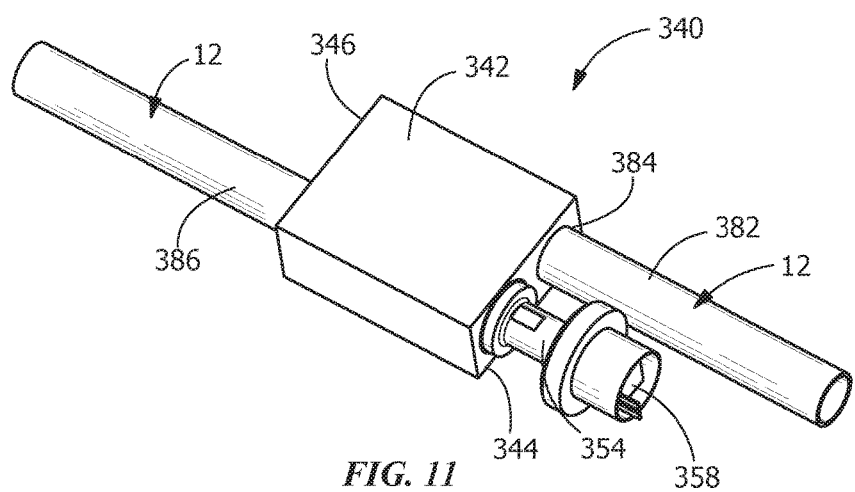
FIG. 11 is a perspective view of a third alternate illustrative valve of the present invention in line with a heat pipe.

In another alternate illustrative embodiment, as shown in FIGS. 8 through 10, a heating device (not shown), such as, but not limited to, an electric resistance heater, may be provided proximate to or in engagement with each valve 240. The device can be activated to provide additional control of the valve 240. In such embodiments, the valve 240 has two modes of operation: 1) "passive" (as described above) when the phase change material phase is determined by the heat pipe temperature only, and 2) "active", when the phase change material phase is determined by the temperature of the heating device which can be controlled by the operator or user.

One example of the such a heating device is a small tape heater. The device may be mounted or wrapped around a portion 241, near to the area where the phase change material actuator 254 is positioned. In operation, when the ambient conditions reach a certain defined point (below the melting point of the phase change material 266 of the phase change material actuator 254), a control system (not shown) sends electrical power to the heating device which increases the temperature of the valve housing 242, thereby causing the phase change material to melt, which in turn closes the valve 240, in a similar manner as previously described with respect to FIGS. 2 through 4. When the control system determines that the heat pipe 12 should begin to function normally, the electrical power to the heating device is shut off, allowing the phase change material to solidify, allowing the valve to open, in the same manner as previously described.

A second example of the heating device is a heat source positioned in the flow volume of the valve 240 through opening 245. In the embodiment shown, the heat source is embedded within the flow volume of the valve without actually penetrating the wall of the valve 240. In this embodiment, a coupling 243 is provided to hold the phase change material actuator 254 and contain the heating element or device. In the illustrative embodiment, the coupling 243 is designed to receive a 0.125" diameter cartridge heater, resistance heater or some other similarly sized heating element. A benefit of this configuration is that it places the heat source and the phase change material in close proximity to one another so that the heat moves directly to the phase change material. This allows the heating element or device to be more efficient, as energy is not wasted heating the remainder of the valve housing 242. The coupling 243 also allows more consistent heating of the phase change material, as the heating is provided uniformly about the phase change material actuator 254. In such embodiments, as the phase change material actuator 254 is now fixed at one end, the relief spring 258 is incorporated within or proximate to the tapered plug assembly 252. The operation is essentially the same as in the passive valve described above except that the phase change material is melted when the heating device receives power and increases the temperature around the phase change material rather than phase change material being melted when the ambient temperature reaches the melting temperature.

This embodiment uses electrical energy to open and close the valve without requiring a physical path into the heat pipe 12. Consequently, as the valve 240 remains sealed, the use of the heating device does not increase the risk of having a leak which would degrade the heat pipe performance.

In some applications, it may be beneficial to initiate the closing of the valve with a high power input to the heating device to quickly activate the phase change material and rapidly close the passage closing member and the valve. Once the valve is moved to the closed position, the input is then reduced to a lower power value to maintain the phase change material in the liquid or expanded state, thereby maintaining the passage closing member and the valve in the closed position.

The phase change material may be located on the evaporator side of the seal of the phase change material actuator, proximate the evaporator portion of the heat pipe. Alternatively, the phase change material may be located on the condenser side of the seal of the phase change material actuator, proximate the condenser portion of the heat pipe.

Referring to FIGS. 11 through 14, an illustrative embodiment of an alternate valve 340 according to the teaching of the present invention is shown. The valve 340 is an active valve as will be more fully described below. In the illustrative embodiment shown, the valve 340 has an outside housing 342 which has a generally rectangular configuration with ends 344, 346. End 346 of the housing 342 serves as an interface with the heat pipe 12 at the outlet end of the valve 340. End 344 of the housing 342 serves as an interface with the heat pipe 12 at the inlet end of the valve 340. The housing 342 may be made from metal (such as brass, copper, stainless steel), plastic or any material having the required characteristics to allow a fluid to pass therethrough without leaking or failing. The particular configuration of the valve 340 may be varied without departing from the scope of the invention.

Figure 13:
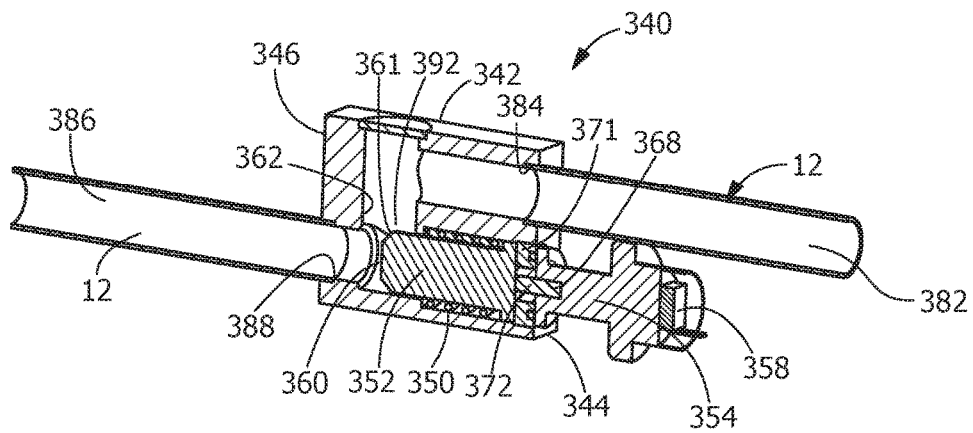
FIG. 13 is a cross-sectional view of the valve of FIG. 11 shown in an open position.
Figure 14:
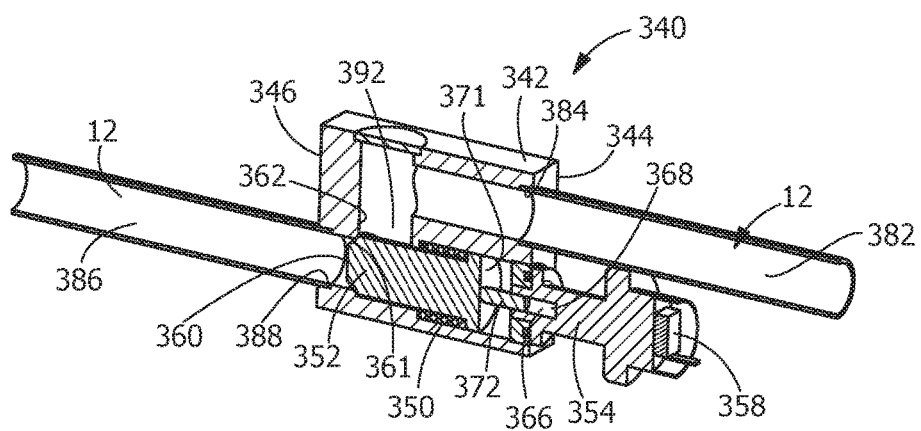
FIG. 14 is a cross-sectional view of the valve of FIG. 11 shown in a closed position.

As best shown in FIGS. 13 and 14, the valve 340 includes a return spring 350, a passage closing member or sealing member 352 and a phase change material actuator 354. A resistive heater 358 is positioned proximate the phase change material actuator 354, as will be described below. The phase change material actuator 354 is engineered to produce a linear force at a specific temperature which corresponds to the melting point of the phase change material 366 inside. The return spring 350 is provided to reopen the valve 340 after the temperature proximate the phase change material actuator 354 drops below the melting point of the phase change material of the phase change material actuator 354 and the phase change material solidifies. The return spring 350 has sufficient spring force to recompress the solidified phase change material within the phase change material actuator 354. The sealing member 352 is the mechanism used to create a seal inside of the valve. The sealing member 352 may be, but is not limited to, a sliding mechanism. An end 360 of the sealing member 352 engages with a surface 362 at the outlet end 346 when the sealing member 352 is closed. An end 360 may have an angled surface 361 to cooperate with the surface 362 to create a reliable seal when the sealing member 352 is moved to the closed position. The sealing member 352 provides an adequate seal under pressure, yet does not bind when the valve 340 is reopened and the end 360 is moved away from the surface 362, causing the seal to be broken.

Figure 12:
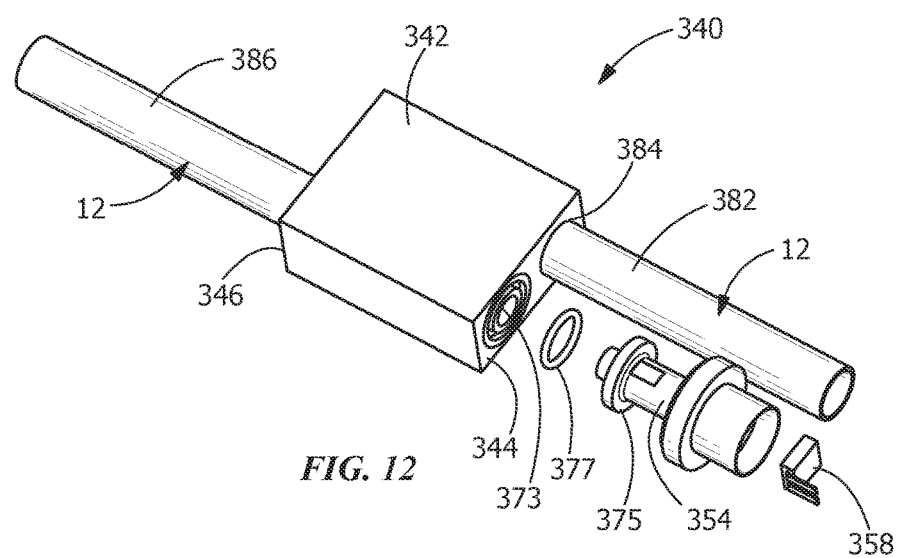
FIG. 12 is a perspective view of the valve of FIG. 11 with the actuator and heater exploded therefrom.

The phase change material actuator 354 is a sealed housing that contains a phase change material 366, such as, but not limited to, a wax, which generates linear motion as it melts. The phase change material 366 is housed in a chamber 368 of the housing. As the chamber 368 has a defined shape and volume, the chamber 368 can be configured to properly control the direction and rate of expansion of the phase change material 366 when it melts and when it is solidified. In the illustrative embodiment shown, the expansion of the phase change material 366 deforms a seal which drives a piston 372 outward toward the sealing member 352. The phase change material actuator 354 may be self contained and inserted into the housing 342 through opening 373 (FIG. 12). Referring to FIG. 12, the actuator 354 is fixedly attached to the housing 342 to maintain the actuator 354 in position relative to the housing 342. A collar 375 and seal 377, such as an O-ring, are provided to properly secure and seal the actuator 354 to the housing 342. The piston 372 cooperates with a piston engagement end 371 of the sealing member 352, whereby as the piston 372 is moved toward the sealing member 352, the piston engages the piston engagement end 371 causing the sealing member 352 to move from the first or open position shown in FIG. 13 to the second or closed position shown in FIG. 14.

The completed valve 340, with the actuator 354 is inserted onto a respective heat pipe 12. In so doing an end of a heat pipe segment 382 is inserted into an opening 384 of the end 344. In the illustrative embodiment shown, the heat pipe segment 382 is a condenser portion of the heat pipe 12 and the heat pipe segment 386 is an evaporator portion of the heat pipe 12, although other configurations can be used.

In this illustrative embodiment, the actuator 354 is positioned to the outside of the valve 340 to thermally isolate the actuator 354 from the heat pipe 12. In this orientation the resistive heater 358 is located in close proximity to the phase change material 366. As the resistive heater 358 is located outside of the valve 340, the conduction path between the heater 358 and the rest of the heat pipe 12 is very small. In various illustrative embodiments, the actuator 354 includes a counter bore on the bottom surface that is sized to contain the resistive heater 358. The resistive heater is potted into the counter bore on the actuator using epoxy. By positioning the actuator 354 outside of the main valve body, less electrical power is required to melt the phase change material 366. In contrast, an embodiment in which the actuator is contained within the main valve body, additional electrical power is required to melt the phase change material 366 because of the additional mass and heat losses present when the actuator is located within the valve 340.

In operation, during normal ambient conditions, the phase change material 366 is solidified and the actuator 354 is in the open position (as shown in FIG. 13). The valve 340 remains open until a design temperature is supplied to the phase change material 366 by the resistive heater 358 is reached. In the open position (as shown in FIG. 13), the sealing member 352 does not engage the surface 362 of the channel 392 which extends through the valve 340. The channel 392 accommodates the flow of the working fluid between the heat pipe segment 382 and the heat pipe segment 386. As the sealing member 352 is not positioned in and does not block the channel 392, the working fluid flows through the channel 392 and passes through the valve 340. In the open position, the phase change material 366 is in a solid state.

When the valve is to be closed to disable the heat pipe 12, a switch is activated and electrical power is applied to the resistive heater 358 that is embedded in the base of the actuator 354, causing the heater 358 to supply heat to the phase change material 366. When the temperature of the phase change material 366 reaches the design temperature, the phase change material 366 melts, which drives the piston 372 to move toward and engage the sealing member 352. As this occurs, the piston 372 moves the end 360 of the sealing member 352 into engagement with the surface 362 of the channel 392, thereby causing the passage or channel 392 through the valve 340 to be closed or blocked. In the closed position (as shown in FIG. 14), the working fluid is prevented from passing through the channel 392 of the valve 340, thereby preventing heat transfer between the condenser portion 382 and the evaporator portion 386 when the designed temperature is reached or exceeded. Phase change material 366 remains in the melted state and the valve 340 remains closed the entire time that the resistive heater 358 is powered and above the design temperature. In this closed position, the piston 372 is maintained in position with the sealing member 352 and the sealing member 352 remains in engagement with the surface 362 of the channel 392. A relief spring (not shown) may be included to allow for some continued expansion of the phase change material 366 after the piston 372 engages the sealing member 352, thereby preventing excess pressure from damaging the piston 372, the sealing member 352 and/or the phase change material actuator 354.

When the resistive heater 358 is not powered and the temperature drops below the design temperature, the phase change material 366 again solidifies. As this occurs, the return spring 350 causes the sealing member 352 and the piston 372 to move from the closed position (FIG. 14) to the initial or open position (FIG. 13), thereby allowing the working fluid to again pass through the valve 340, allowing the heat pipes 12 to resume normal operation.

A wrap-around heat exchanger can be designed to incorporate valves 340 which may be activated or melted by different switches, thereby allowing respective valves to be actuated across at different times and across wide temperature spectrum. In so doing, the wrap-around heat exchanger can be manufactured with valves 340 that disable the most efficient number of heat pipes 12, thereby preventing excess reheating without compromising on efficiency. The phase change material is chosen such that the phase change material has a significant change in volume as the temperature is varied by a few degrees, thereby allowing the actuation of the valve 340 to occur over a small range of temperatures.

In this illustrative embodiment, the valve 340 may operate in two modes of operation: 1) "passive" when the phase change material phase is determined by the ambient air temperature only, and 2) "active" when the phase change material phase is determined by the temperature of the resistive heater 358 which can be controlled by the operator or user.

In some applications, it may be beneficial to initiate the closing of the valve with a high power input to the heating device to quickly activate the phase change material and rapidly close the passage closing member and the valve. Once the valve is moved to the closed position, the input is then reduced to a lower power value to maintain the phase change material in the liquid or expanded state, thereby maintaining the passage closing member and the valve in the closed position.

The phase change material may be located on the evaporator side of the seal of the phase change material actuator, proximate the evaporator portion of the heat pipe. Alternatively, the phase change material may be located on the condenser side of the seal of the phase change material actuator, proximate the condenser portion of the heat pipe.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A heat exchanger comprising:
   a plurality of heat pipes, two or more of the heat pipes having a thermally actuate control valve;
   each thermally actuate passive control valve comprising:
   a housing having a first opening for receiving a condenser portion of a respective heat pipe therein, a second opening for receiving an evaporator portion of the respective heat pipe therein, a passage extending through the housing from the first opening to the second opening, the passage configured to receive working fluid from the heat pipe therein;
   a passage closing member positioned in the housing proximate to or in the passage, the passage closing member having a surface which cooperates with a wall of the passage, the passage closing member is movable between an open position and a closed position;
   a heater provided proximate the passage closing member, the heating device configured to supply heat to the passage closing member;
   wherein with the passage closing member in an open position, the valve is configured to provide a flow path for the working fluid;
   wherein at a design temperature, the passage closing member moves into the passage to the closed position, preventing the flow of the working fluid, thereby preventing heat transfer between the condenser portion and the evaporator portion when the design temperature is reached or exceeded;
   a phase change material of first respective thermally actuate passive control valves positioned in first heat pipes of the plurality of heat pipes is activated or melted at a different temperature than a phase change material of second respective thermally actuate passive control valves positioned in second heat pipes of the plurality of heat pipes.

2. The heat exchanger as recited in claim 1, wherein the opening and closing of the passage closing member is determined by the expansion and contraction of the phase change material of the first respective heat pipes and the second respective heat pipes.

3. The heat exchanger as recited in claim 2 wherein the phase change material is encapsulated in an actuator which controls the motion of the passage closing member.

4. The heat exchanger as recited in claim 2, wherein the heating device is an electrical resistance heater.

5. The heat exchanger as recited in claim 1, wherein the passage closing member is a pivoting gate mechanism.

6. The heat exchanger as recited in claim 5, wherein the pivoting gate mechanism includes a spring which returns the pivoting gate mechanism to its original position.

7. The heat exchanger as recited in claim 2, wherein the phase change material is located on an evaporator side of the passage closing member.

8. The heat exchanger as recited in claim 2, wherein the phase change material is located on a condenser side of the passage closing member.

9. The heat exchanger as recited in claim 1, wherein the passage closing member is a rotating mechanism.

10. The heat exchanger as recited in claim 1, wherein the passage closing member is a sliding mechanism.

11. The heat exchanger as recited in claim 2, wherein the phase change material is located external to the housing, the phase change material controls the motion of the passage closing member.

12. The heat exchanger as recited in claim 1, wherein the heat pipe is a loop heat pipe.

13. The heat exchanger as recited in claim 1, wherein the passage closing member is a tapered plug.

14. The heat exchanger as recited in claim 1, wherein a return spring is provided and cooperates with passage closing member to move the passage closing member to an open position after the temperature drops below the melting point of the phase change material of the phase change material actuator, allowing the working fluid to flow through the passage and the valve.

15. The heat exchanger as recited in claim 1, wherein the phase change material is a wax.

16. The heat exchanger as recited in claim 4, wherein the electrical resistance heater uses an initial first power input to activate the phase change material and close the passage closing member.

17. The heat exchanger as recited in claim 4, wherein the electrical resistance heater switches to a continuous second power input after the valve has closed, the second power input being less than the first power input, to maintain the phase change material in a liquid state and to maintain the passage closing member in the closed position.

18. A heat exchanger for use in a two-phase system, the heat exchanger comprising:
   a plurality of heat pipes, at least two of the heat pipes having a thermally actuate control valve;
   each thermally actuate passive control valve comprising:
   a housing having a first opening for receiving a condenser portion of a respective heat pipe of the plurality of heat pipes therein, a second opening for receiving an evaporator portion of a respective heat pipe of the plurality of heat pipes therein, a passage extending through the housing from the first opening to the second opening, the passage configured to receive working fluid from the respective heat pipe therein;
   a phase change material actuator positioned in the housing, the phase change material actuator having a sealed chamber with phase change material positioned therein;
   a passage closing member positioned in the housing proximate to or in the passage and proximate to the phase change material actuator, the passage closing member having a surface which cooperates with a wall of the passage;

a heater provided proximate the phase change material, the heater positioned outside of the housing;

wherein phase change material of first respective thermally actuate passive control valves positioned in first heat pipes of the plurality of heat pipes has a different melting point than the phase change material of second respective thermally actuate passive control valves positioned in second heat pipes of the plurality of heat pipes.

19. The heat exchanger as recited in claim 18, wherein the heater is an electrical resistance heater.

\* \* \* \* \*